(12) United States Patent
Fujimoto et al.

(10) Patent No.: US 11,494,702 B2
(45) Date of Patent: Nov. 8, 2022

(54) TASK ESTIMATION METHOD AND INFORMATION PROCESSING APPARATUS

(71) Applicant: FUJITSU LIMITED, Kawasaki (JP)

(72) Inventors: Junya Fujimoto, Atsugi (JP); Yuichi Murase, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 820 days.

(21) Appl. No.: 16/437,787

(22) Filed: Jun. 11, 2019

(65) Prior Publication Data

US 2020/0012993 A1 Jan. 9, 2020

(30) Foreign Application Priority Data

Jul. 5, 2018 (JP) .............................. JP2018-127943

(51) Int. Cl.
| | | |
|---|---|---|
| *G06N 20/20* | (2019.01) | |
| *G06N 20/00* | (2019.01) | |
| *G06N 20/10* | (2019.01) | |
| *G06Q 10/06* | (2012.01) | |
| *G06N 5/04* | (2006.01) | |
| *G06N 5/02* | (2006.01) | |

(52) U.S. Cl.
CPC .............. *G06N 20/20* (2019.01); *G06N 20/00* (2019.01); *G06N 20/10* (2019.01); *G06Q 10/0633* (2013.01); *G06N 5/025* (2013.01); *G06N 5/04* (2013.01); *G06Q 10/063114* (2013.01)

(58) Field of Classification Search
CPC ........ G06N 20/00; G06N 20/10; G06N 20/20; G06N 5/025; G06N 5/04; G06Q 10/0633; G06Q 10/063114; G10L 2015/0631
See application file for complete search history.

(56) References Cited

U.S. PATENT DOCUMENTS

| | | | | |
|---|---|---|---|---|
| 9,880,879 B1 * | 1/2018 | Hagmann | ............. | G06F 9/5088 |
| 2014/0309614 A1 * | 10/2014 | Frei | ........................ | A61N 1/361 |
| | | | | 607/45 |
| 2018/0365697 A1 * | 12/2018 | Yan | ..................... | G06Q 20/405 |

FOREIGN PATENT DOCUMENTS

| | | |
|---|---|---|
| JP | 2006-209468 | 8/2006 |
| JP | 2016-90371 | 5/2016 |

OTHER PUBLICATIONS

Tomoko Murakami, et al. "Estimation of Nursing Work from Sensor Data by Topic Model" JSAI Technical Report SIG-DOCMAS-B102-2, Japanese Society of Artificial Intelligence, Mar. 11, 2012. (8 pages).

* cited by examiner

*Primary Examiner* — Shane D Woolwine
(74) *Attorney, Agent, or Firm* — Staas & Halsey LLP

(57) ABSTRACT

An information processing apparatus includes a processor that acquires measurement information measured by a device put on a task performer; detects a predetermined operation in the measurement information; extracts feature vectors from an operation section in which the predetermined operation has been detected; divides the feature vectors into clusters by division methods; obtains ratios at which the feature vectors are classified into the respective clusters in a predetermined time; performs learning by using the ratios as an input and using, as an output label, information indicating whether the task performer performs a predetermined task in the predetermined time; generates a task estimation model by determining weighting for the clusters based on a result of the learning; and estimates, by using the task estimation model, whether the task performer is in a process of performing the predetermined task.

7 Claims, 17 Drawing Sheets

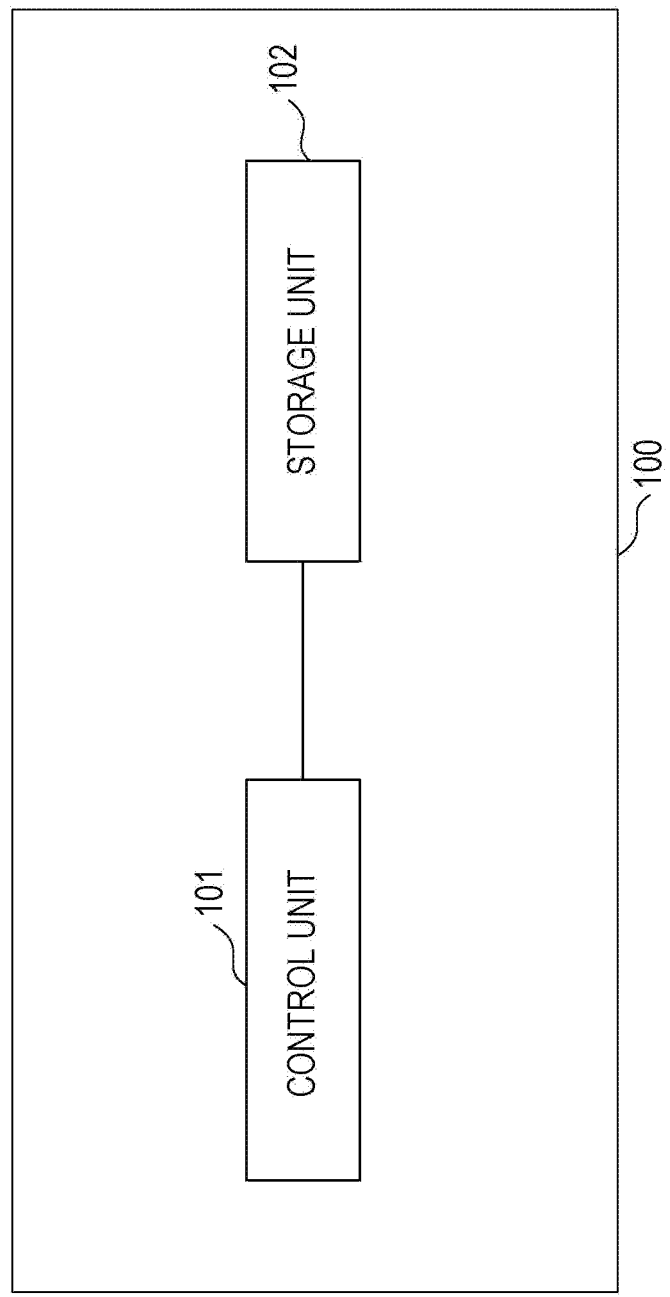

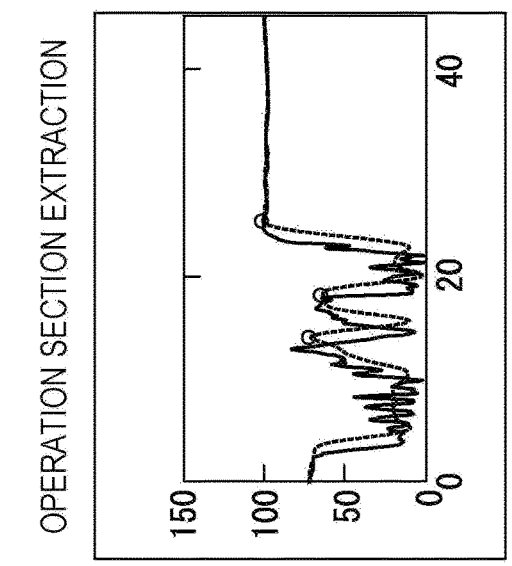

| TYPE | PATTERN |
|---|---|
| ACCELERATION SENSOR | LOW PASS FILTER → NORM |
| ⋮ | ⋮ |
| ⋮ | ⋮ |

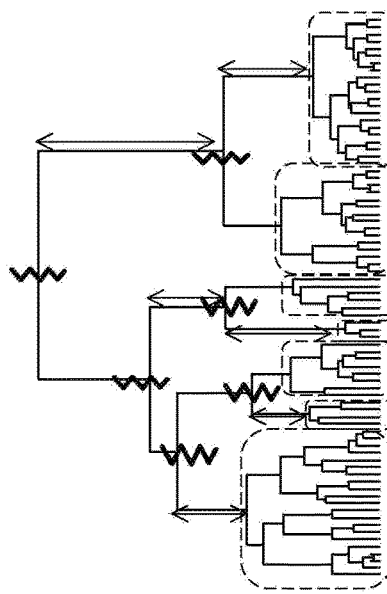
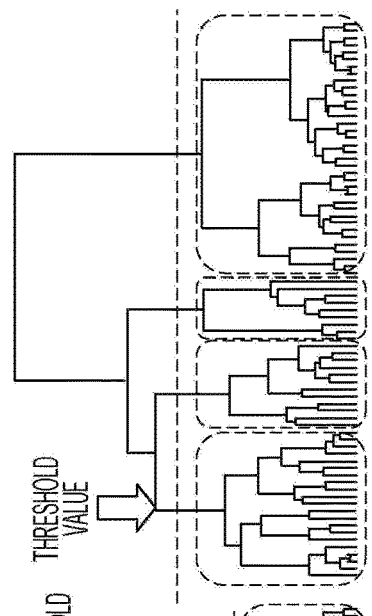
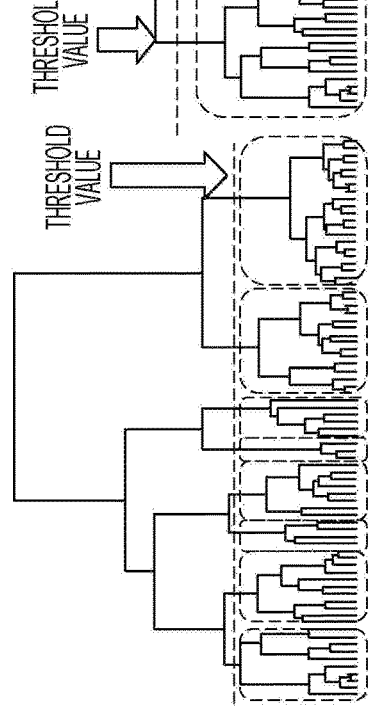

900

| START TIME | END TIME | TASK CONTENT |
|---|---|---|
| 8:23:20 | 8:46:00 | LUGGAGE ARRANGEMENT |
| 8:47:41 | 8:48:30 | DEPARTURE PREPARATION |
| 8:48:40 | 8:52:05 | TRUCK MOVEMENT |
| 8:52:14 | 8:54:10 | TRUCK DELIVERY |
| 8:55:00 | 8:57:38 | TRUCK MOVEMENT |
| 8:57:57 | 8:59:25 | HANDOVER |

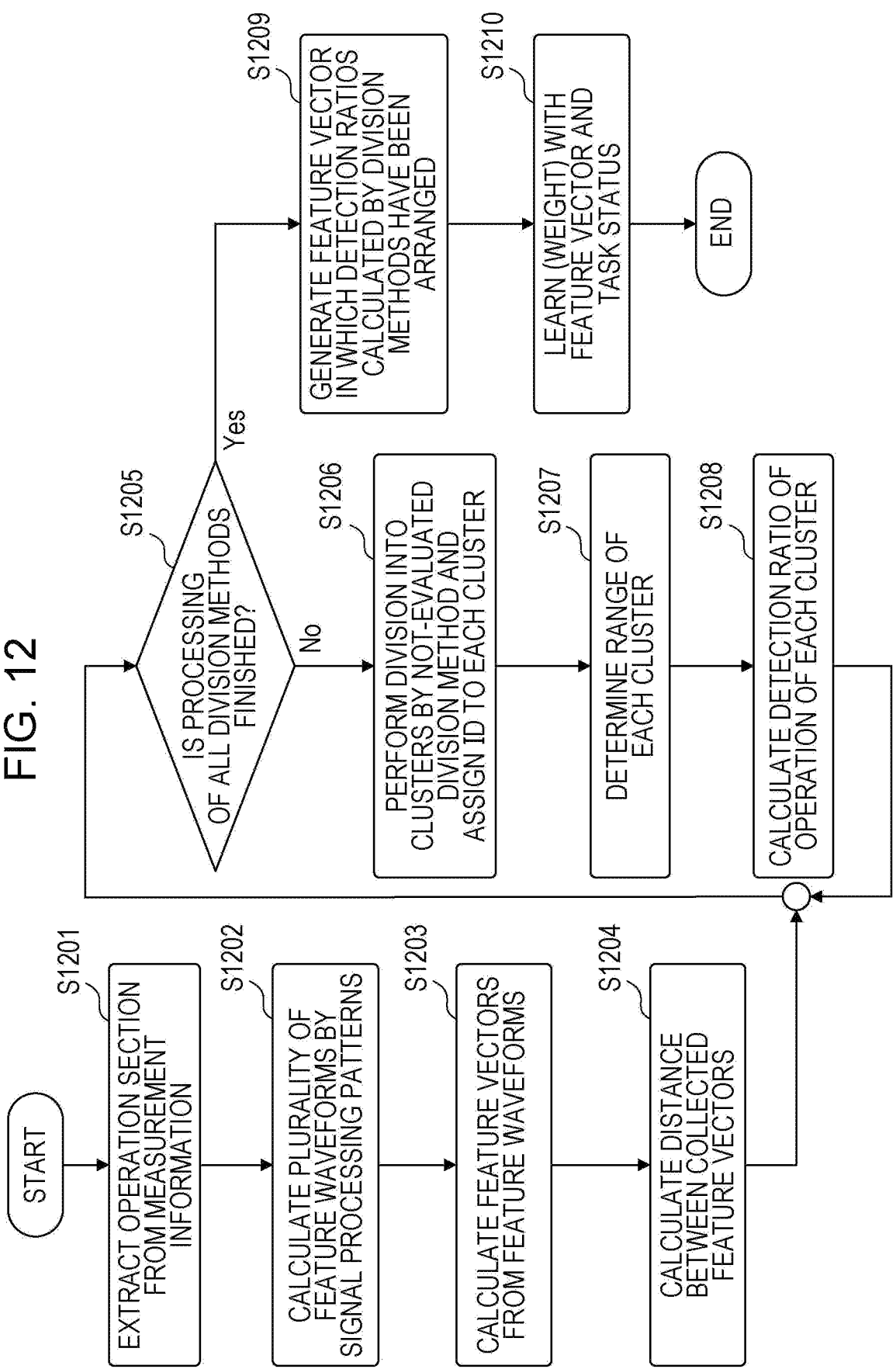

TASK ESTIMATION METHOD AND INFORMATION PROCESSING APPARATUS

CROSS-REFERENCE TO RELATED APPLICATION

This application is based upon and claims the benefit of priority of the prior Japanese Patent Application No. 2018-127943, filed on Jul. 5, 2018, the entire contents of which are incorporated herein by reference.

FIELD

The embodiments discussed herein are related to a task estimation method and an information processing apparatus.

BACKGROUND

For example, in order to watch over or evaluate a task performer of a task, a technology of estimating the posture or state of the task performer by using measurement information obtained from a sensor and the like, which is provided in a wearable device put on the body of the task performer, has been developed. The wearable device includes, for example, a badge-type device attached to the chest of the task performer and a band-type device attached to an arm of the task performer. The sensor includes an acceleration sensor, a gyro sensor, an atmospheric pressure sensor, and a magnetic sensor, for example.

Related techniques are disclosed in, for example, Japanese Laid-open Patent Publication No. 2016-90371 and Japanese Laid-open Patent Publication No. 2006-209468.

In addition, related techniques are disclosed in, for example, Tomoko Murakami and three persons, "Estimation of Nursing Work from Sensor Data by Topic Model" JSAI Technical Report SIG-DOCMAS-B102-2, Japanese Society of Artificial Intelligence, Mar. 11, 2012.

For example, the feature quantity may be extracted from measurement information measured by a sensor in a device such as a wearable device, which has been put on the body of a task performer, and an operation of the task performer may be detected from the measurement information by using the extracted feature quantity. For example, simple operations or states of the task performer such as "standing-up", "sleeping", "walking", and "running" may be estimated by examining a waveform of measurement information for a predetermined time. However, a higher-order state, for example, what task the task performer is in, varies in movement variations even in the same task, and thus it is not easy to estimate the higher-order state from the waveform of the sensor. Therefore, providing a technology of allowing estimation of a task state from measurement information measured by a sensor in a wearable device with high accuracy is required.

SUMMARY

According to an aspect of the embodiments, an information processing apparatus includes a processor configured to: acquire first measurement information measured by a first device put on a task performer; detect a predetermined first operation in the first measurement information; extract first feature vectors from a first operation section in which the predetermined first operation has been detected; divide the extracted first feature vectors into first clusters by first division methods; obtain first ratios at which the extracted first feature vectors are classified into the respective first clusters in a predetermined time; perform learning by using the first ratios as an input and using, as an output label, information indicating whether or not the task performer performs a predetermined task in the predetermined time; generate a task estimation model by determining weighting for the first clusters based on a result of the learning; and estimate, by using the task estimation model, whether or not the task performer is in a process of performing the predetermined task.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a functional configuration of an information processing apparatus according to embodiments;

FIGS. 2A to 2D are diagrams illustrating feature vector generation processing according to embodiments;

FIG. 4 is a diagram illustrating a list of a signal processing pattern according to embodiments;

FIGS. 7A to 7C are diagrams illustrating granularity of cluster division;

FIG. 12 is a diagram illustrating task estimation model generation processing in which a cluster is weighted, according to a second embodiment;

DESCRIPTION OF EMBODIMENTS

Figure 3A:
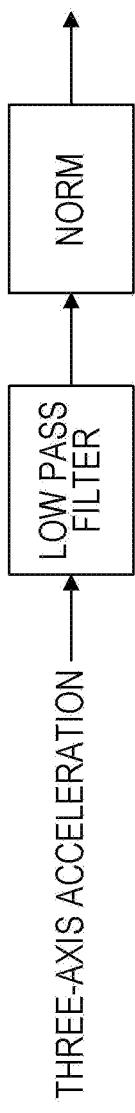
FIGS. 3A to 3D are diagrams illustrating a filter pattern.

Hereinafter, embodiments will be described in detail with reference to the drawings. The corresponding components in a plurality of drawings are denoted by the same reference signs.

As one method of estimating a task performed by a task performer from measurement information detected by a sensor provided in a device such as a wearable device which has been put on the task performer, a method of using the detection frequency of an element operation (walking, running, and the like) of the task performer, which has been detected from the measurement information, is considered.

Procedures of task estimation will be described. For example, measurement information is acquired from sensors in devices of a badge attached to the chest of the task performer and a band attached to an arm thereof. An element operation is detected from the measurement information. The element operation may be a simple operation or state of the task performer such as "standing-up", "sleeping", "walking", and "running", for example. Such an element operation may be detected from the measurement information with high accuracy. The following may be considered. That is, for example, a tendency of a detection frequency of an element operation (walking, running, and the like) in a predetermined time for each task is identified by using measurement information for which the task contents are known. Then, a task is estimated by using the tendency of the detection frequency of the element operation (walking, running, and the like).

In a case where the task is estimated with the frequency of the element operation such as running, walking, standing, and sitting, there is a tendency to be easy to distinguish between tasks having a difference in way of moving. However, it may be difficult to distinguish tasks having different task contents in the same place. In order to detect the element operation, learning is performed by preparing teaching data and the like for each element operation. However, preparation of the teaching data and the like may also have difficulty. Therefore, it is desired to provide a new method of estimating a task.

In the embodiments described below, it is possible to improve estimation accuracy of a task. According to the embodiments described below, it is possible to collect determination criteria for estimating a task more easily.

FIG. 1 is a diagram illustrating a functional configuration of an information processing apparatus 100 that estimates a task, according to the embodiments. The information processing apparatus 100 includes a control unit 101 and a storage unit 102, for example. The control unit 101 performs processing of estimating a task according to the embodiments, for example. The storage unit 102 in the information processing apparatus 100 stores information such as a list 400 (FIG. 4) and task history information 900 (FIG. 9), for example. Details of the units and details of the information stored in the storage unit 102 will be described later.

Feature vector generation processing according to the embodiments will be described.

The feature vector generation processing according to the embodiments will be described with reference to FIGS. 2A to 5. For example, it is assumed that a task performer 201 wears a device 205. In the example in FIGS. 2A to 2D, the task performer 201 wears, as the device 205, a badge 202 and a band 203. Measurement information in a task of the task performer is collected by sensors provided in the badge 202 and the band 203 (FIG. 2A).

The control unit 101 extracts data of an operation section in which it is estimated that the task performer is performing a certain operation, from the collected measurement information (FIG. 2B). The operation section may be a section including a time point at which a distinctive operation or state of the task performer has been detected, for example. As an example, the control unit 101 may extract a section of several seconds before and after a time point at which an angle of an arm tip of the task performer to the gravity direction is a peak (maximum), as the operation section. The change in the angle of the arm tip of the task performer to the gravity direction may be acquired by combining measurement information of an acceleration sensor and a gyro sensor, for example. In the example in FIG. 2B, the waveform of the change in the angle of the arm tip of the task performer to the gravity direction, which has been acquired by using the measurement information of the acceleration sensor and the gyro sensor, passes through a low pass filter so as to become blunt. Then, the time point at which the peak (maximum) of the angle is provided is identified. It is known that the change appears later than the raw data in a case where a signal passes through the low pass filter to become blunt. Therefore, in one embodiment, considering the delay, the operation section may be extracted in a manner that the time turns back from the time point of the peak detected from the waveform blunt by passing through the low pass filter, by seconds corresponding to the delay. In another embodiment, another type of information may be used instead of the angle of the arm tip of the task performer to the gravity direction. As an example, the operation section may be extracted by using a time point at which an acceleration norm or an angular velocity norm is a peak (maximum). In still another embodiment, the operation section may be extracted by using information of a time point at which the acceleration norm or the angular velocity norm is the minimum, before and after the time point at which the acceleration norm or the angular velocity norm is the maximum.

The control unit 101 performs filtering of the operation section extracted from the measurement information of each of a plurality of sensors in the devices 205, with a plurality of signal processing patterns (FIG. 2C). Thus, the control unit 101 obtains plural kinds of waveform data corresponding to the operation section (FIG. 2D).

Regarding the signal processing pattern in filtering, for example, known filter patterns and the like for extracting a useful waveform (may be referred to as a feature waveform below) depending on the type of the sensor may be used.

FIGS. 3A to 3D are diagrams illustrating filter patterns. FIG. 3A illustrates a filter pattern for extracting an acceleration norm from the detected value of the acceleration sensor. As illustrated in FIG. 3A, a low pass filter is applied to three-axis acceleration data included in measurement information from the three-axis acceleration sensor, then a norm is calculated, and thereby obtaining the acceleration norm.

Figure 3B:
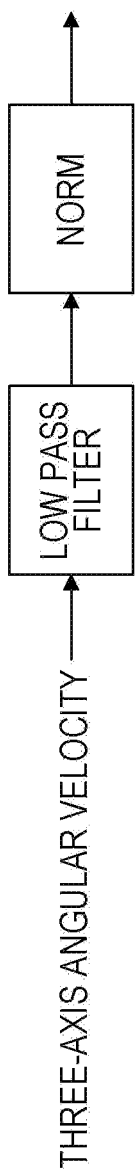
Figure 3C:
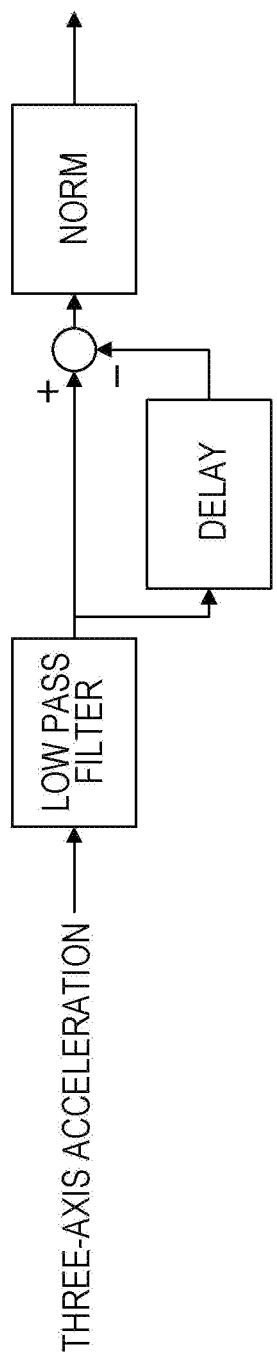
Figure 3D:
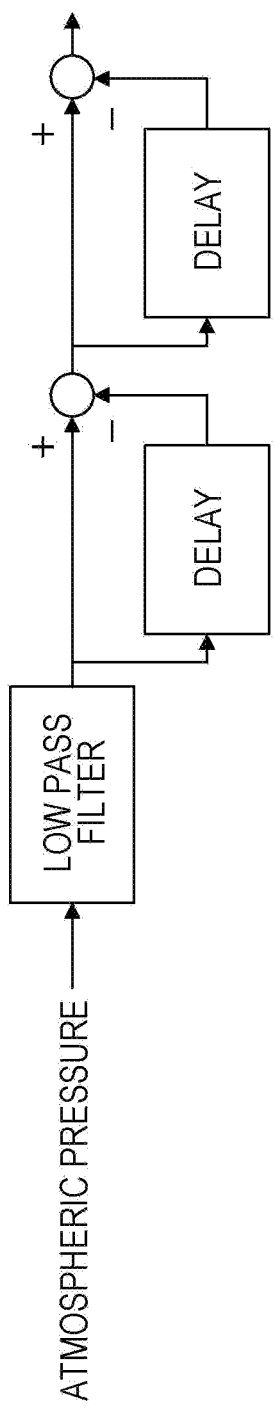

FIG. 3B illustrates a filter pattern for extracting an angular velocity norm from the detected value of the gyro sensor. As illustrated in FIG. 3B, a low pass filter is applied to three-axis angular velocity data included in measurement information from the three-axis gyro sensor, then a norm is calculated, and thereby obtaining the angular velocity norm. Similarly, FIG. 3C illustrates a signal processing pattern for extracting the change of an inclination to the gravity direction. FIG. 3D illustrates a signal processing pattern of an atmospheric pressure second order difference.

The signal processing patterns illustrated in FIGS. 3A to 3D are examples. The signal processing pattern is not limited thereto, and another filter pattern may be used. As illustrated in FIG. 4, the list 400 of the signal processing patterns obtained by associating the type of measurement information as a processing target and the signal processing pattern to be used in signal processing may be stored in the storage unit 102.

The control unit 101 may process measurement information for the operation section extracted from measurement information with the plurality of signal processing patterns, and thereby calculates one feature waveform for each signal processing pattern. That is, in a case where the control unit 101 processes measurement information for the operation section with M (M is a natural number of 1 or more) signal processing patterns, M feature waveforms are obtained from one piece of measurement information.

Figure 5:
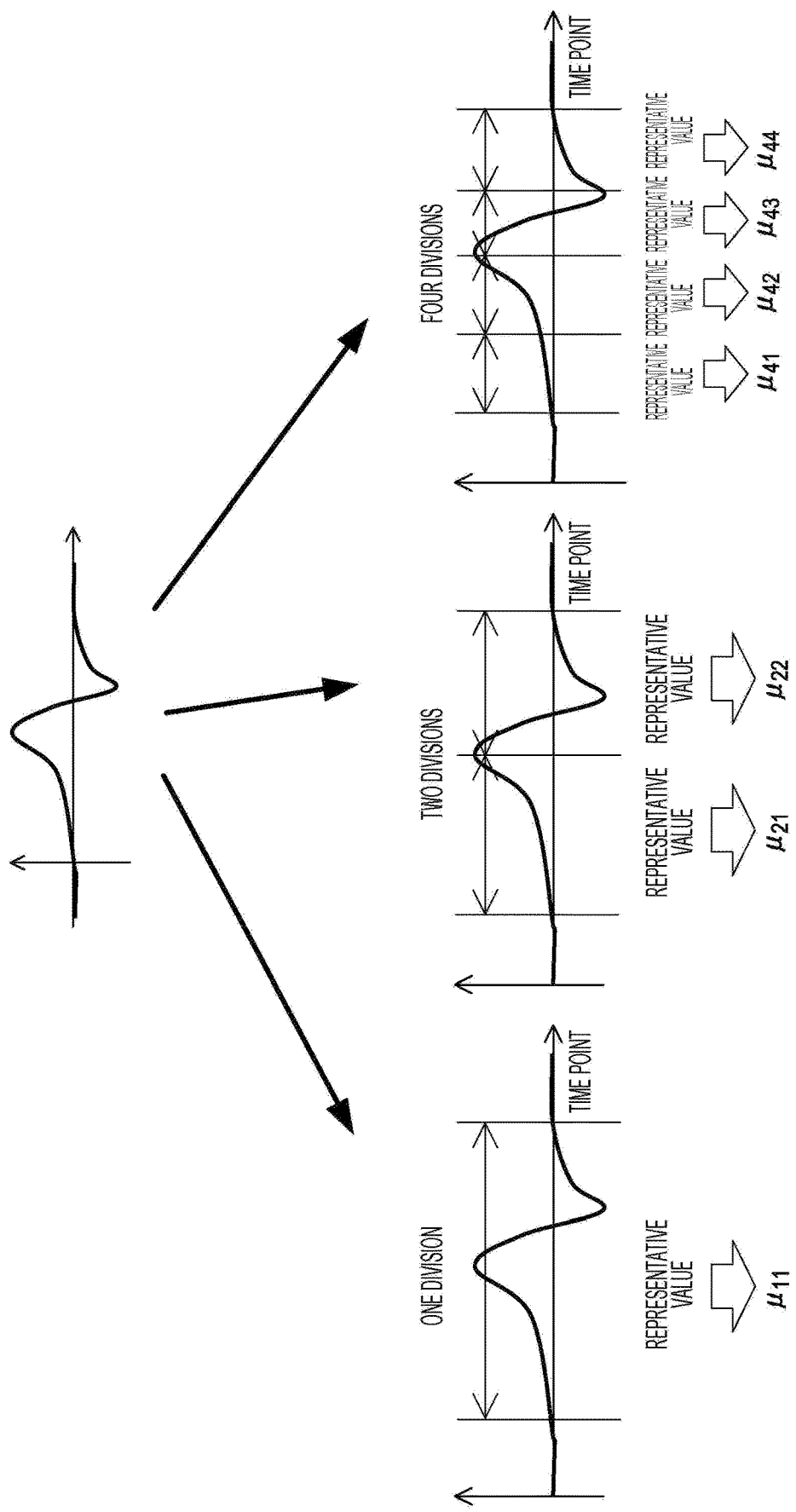
FIG. 5 is a diagram illustrating extraction of a plurality of representative values from a feature waveform.

The control unit 101 extracts a feature vector from the generated feature waveform. Firstly, the control unit 101 acquires a plurality of representative values from the feature waveform. FIG. 5 is a diagram illustrating extraction of the plurality of representative values from the feature waveform. For example, in one embodiment, the control unit 101 temporally equally divides one generated feature waveform by a plurality of types of division numbers including the division number of 1. Then, the control unit 101 calculates the representative value in each division section obtained by the division. As the representative value, for example, statistical values such as the mean value, the median value, the maximum value, and the minimum value of the waveform in the division section may be used. In this manner, the plurality of representative values may be obtained from one feature waveform.

The control unit 101 reduces the dimensions of the obtained plurality of representative values by applying the principal component analysis, and acquires a plurality of feature quantities of which the number is smaller than the number of the plurality of representative values. For example, 510 representative values may be dimension-reduced to 10 feature quantities by the principal component analysis. In the above-described manner, the control unit 101 acquires a feature vector in which the plurality of feature quantities obtained by dimension reduction with the principal component analysis are provided as components.

For example, the control unit 101 may repeat the above processing on each of a plurality of feature waveforms obtained for each of a plurality of division sections, so as to obtain a plurality of feature vectors.

Figure 6:
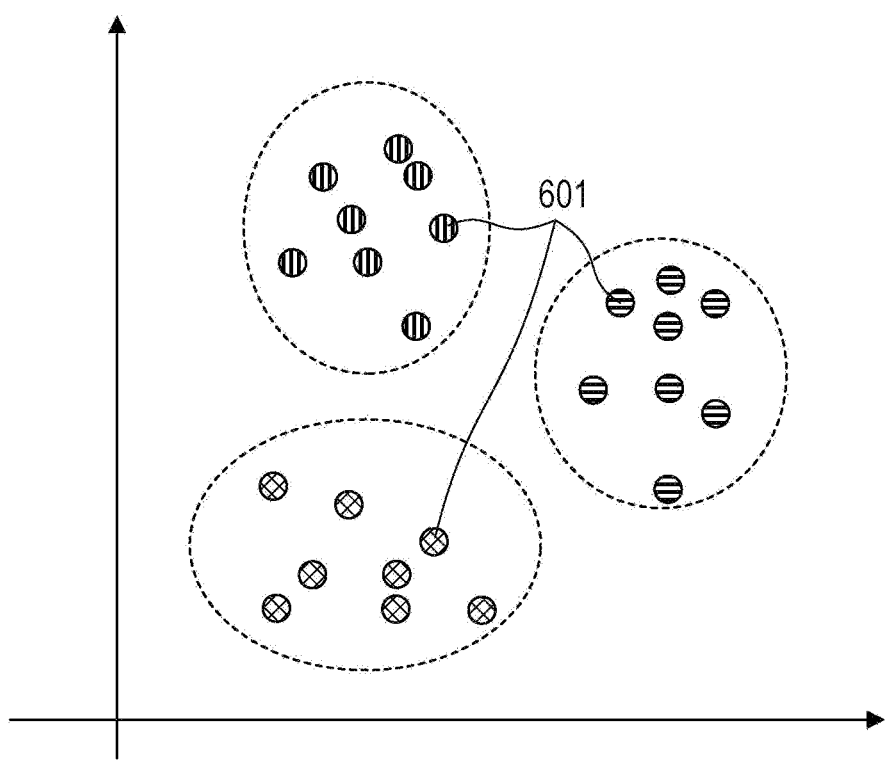
FIG. 6 is a diagram obtained by plotting points indicated by feature vectors.

Clustering of the obtained plurality of feature vectors will be described. FIG. 6 is a diagram obtained by plotting points 601 indicated by the plurality of feature vectors on a multidimensional coordinate system in which each of the plurality of feature quantities obtained from the feature waveform is used as an axis. FIG. 6 illustrates a case in which points 601 indicated by the feature vectors are plotted in a two-dimensional coordinate system as an example of the multidimensional coordinate system. However, in practice, a coordinate system with more dimensions may be provided.

The control unit 101 performs clustering of the feature vectors, and thus divides the plurality of feature vectors into a plurality of clusters. In the example in FIG. 6, the feature vectors are divided into three clusters. The control unit 101 uses, for estimating a task, each of the clusters as an element operation performed in the task.

In this case, the degree of granularity at which clusters are created may have a large influence on the accuracy of task estimation.

FIGS. 7A to 7C are diagrams in which a distance between the plurality of feature vectors is represented in a tree diagram. As the distance, a Euclidean distance or a Mahalanobis distance may be used. The distance between the feature vectors may be calculated by the Ward method, a group average method, the shortest distance method, the longest distance method, or the like.

FIGS. 7A and 7B illustrate cases in which clustering of the plurality of feature vectors is performed at different threshold values. As illustrated in FIGS. 7A and 7B, it is known that the number of clusters is changed by changing the threshold value of division. As illustrated in FIG. 7C, a method of performing clustering based on a distance between two clusters in cluster merging is also provided in addition to the method of designating the number of divisions or the threshold value of division. Also, in this case, a plurality of division patterns are considered by changing a division distance used as the threshold value.

If the division of the clusters is too fine, the detection frequency of the element operation corresponding to the cluster may vary each time even in the same task. If the division of the clusters is too coarse, it may not be possible to distinguish between even different tasks because there is no difference in detection frequency of the element operation corresponding to the cluster. Therefore, it is desired to provide a technology of allowing performing of clustering useful for task estimation.

First Embodiment

In a first embodiment, the control unit 101 performs clustering with a plurality of division methods by using, as teaching data, measurement information for which the task contents are known. Then, the control unit 101 evaluates effectiveness of the obtained plurality of clusters in task estimation.

Firstly, the control unit 101 performs clustering of points plotted on the multidimensional coordinate system by one division method selected among the plurality of division methods. Then, the control unit 101 uses each of the obtained plurality of clusters as the element operation. For example, in the example in FIG. 8, the control unit 101 divides the feature vector into three clusters and uses the clusters as an element operation A, an element operation B, and an element operation C.

The control unit 101 generates a model (may be referred to as a task estimation model below) for estimating a task, by using the element operation A, the element operation B, and the element operation C that are divided into clusters. The task estimation model may be generated in a manner that machine learning is performed by using, as teaching data, measurement information for which the contents of a running task are known. As an example, the task estimation model may be generated by using a support vector machine (SVM). In the following example described below, a task estimation model is generated by using the SVM, from a ratio of each of the element operations (element operation A, element operation B, and element operation C) to the total number of element operations detected per predetermined time. For example, the task estimation model may be generated for each task and used for estimating whether or not the task is being performed by the task performer, based on the measurement information.

<Generation of Task Estimation Model>

Figures 8, 9:
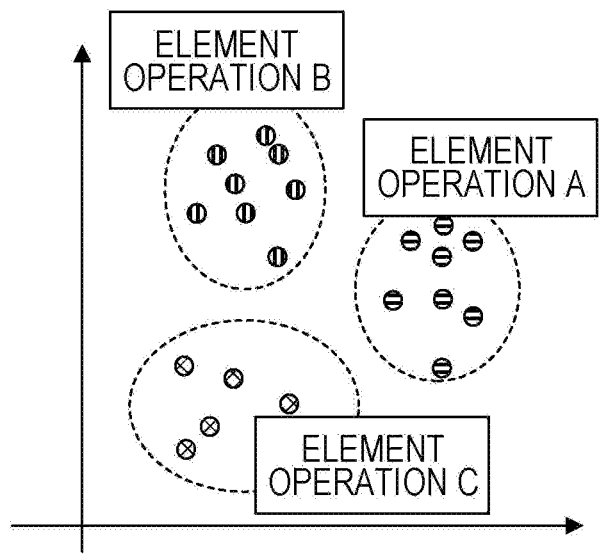
FIG. 8 is a diagram illustrating an element operation obtained by clustering.
FIG. 9 is a diagram illustrating task history information according to embodiments.

Acquisition of the ratios of the detection of the element operation A, the element operation B, and the element operation C per predetermined time will be described. FIG. 9 is a diagram illustrating task history information 900 according to the embodiments. In the task history information 900, an entry in which the performed task and a time section in which the task has been performed are associated with each other is registered. In the following example of generating the task estimation model described below, a target task for generating the task estimation model is set to be luggage arrangement, and clusters are set to be the element operation A, the element operation B, and the element operation C.

For example, the control unit 101 identifies an execution period of luggage arrangement as a generation target of a task estimation model from the task history information 900. The control unit 101 acquires measurement information in the execution period of luggage arrangement from the storage unit 102.

The control unit 101 divides the obtained measurement information at a predetermined time interval. As illustrated in FIG. 2B, the control unit 101 extracts measurement information in the operation section from measurement information in the predetermined time, and identifies a cluster in which a feature vector extracted for each operation section is included among the clusters of the element operations A to C. Thus, the control unit 101 acquires the number (frequency) of each of the element operations A to C detected in the predetermined time.

Similarly, the control unit 101 identifies a period in which a task other than luggage arrangement as the generation target of the task estimation model, from the task history information 900. The control unit 101 acquires measurement information in the identified period from the storage unit 102. The control unit 101 divides the acquired measurement information at a predetermined time interval. The control unit 101 identifies a cluster in which a feature vector of each operation section extracted from the measurement information at the predetermined time interval is included among clusters of the element operations A to C. Thus, the control unit 101 acquires the number (frequency) of each of the element operations A to C detected in the predetermined time.

Then, the control unit 101 obtains the detection ratio of each element operation per predetermined time from the number (frequency) of the clusters of the element operations A to C detected in the predetermined time. For example, it is assumed that three times for the element operation A, five times for the element operation B, and 0 times for the element operation C are detected from measurement information in the predetermined time. In this case, the element operation is detected in the predetermined time eight times. Thus, the detection ratio of the element operation A is obtained as $3/(3+5+0)=3/8$. Similarly, the detection ratio of the element operation B is obtained as $5/(3+5+0)=5/8$.

The control unit 101 performs machine learning with the SVM by using teaching data in which the obtained detection ratios of the element operations A to C are used as an input, and whether or not luggage arrangement is performed when measurement information in a predetermined time in which the detection ratios have been obtained is used as the output label. Thus, the control unit 101 may generate a task estimation model represented by a discriminant function.

The discriminant function representing the task estimation model may be represented by Expression 1 as an example.

$$f(x) = \langle w \cdot x \rangle + b$$
$$= \sum_{i=1}^{n} w_i x_i + b$$

Expression 1

Here, x indicates a column vector represented by $x=\{x1, x2, \ldots, xi\}$, and the detection ratio of the element operation of each cluster described above is input to each vector component. w indicates a weight vector, and b indicates a bias. For example, if the value of f(x) is equal to or more than 0, the value of f(x) may indicate that luggage arrangement is being performed. If the value of f(x) is less than 0, the value of f(x) may indicate that the luggage arrangement is not being performed. As a result of learning, the discriminant function f(x) weighted to the weight vector w is obtained as the task estimation model.

For example, the control unit 101 generates the above task estimation model for each task, and thereby may generate a task estimation model for recognizing whether or not a task is being performed, for each task. Even in a case where cluster division is performed by other division methods of four clusters, five clusters, and the like, similarly, a task estimation model may be generated for each task by using the clusters obtained by the division method.

<Evaluation of Task Estimation Model>

Then control unit 101 evaluates the generated task estimation model by using, as evaluation data, another piece of measurement information for which the contents of a running task are known. The evaluation data may be measurement information which is not used as the teaching data. In an example of task estimation of luggage arrangement, the control unit 101 obtains ratios of the detection of the element operations A to C to all element operations of the clusters detected in the predetermined time, from the evaluation data. The control unit 101 inputs the ratios to the discriminant function obtained as the task estimation model of luggage arrangement. The control unit 101 determines that the task is luggage arrangement if a result obtained by calculating the discriminant function is equal to or more than 0, and determines that the task is not luggage arrangement if the result is less than 0. The control unit 101 evaluates estimation accuracy of the task estimation model based on the determination of whether the determination result coincides with information indicating whether or not luggage arrangement has been actually performed while sensing evaluation data with the sensor.

Cross-validation may be used in generation of the task estimation model and evaluation of estimation accuracy. It is possible to reduce the number of pieces of teaching data prepared for learning and evaluation by using cross-validation.

The control unit 101 may also generate a task estimation model for a task other than luggage arrangement in a similar manner and perform the evaluation. Similarly, for example, the control unit 101 may generate a task estimation model for each task by using clusters obtained by different division methods and perform the evaluation.

Regarding each of the plurality of division methods, the control unit 101 evaluates the task estimation model generated for each task and determines the optimum division method based on the evaluation result. For example, the control unit 101 may select the division method in which the average of the correct answer rates of the task estimation is the highest, as the optimum division method, for each of the plurality of division methods. Alternatively, the control unit 101 may obtain a ratio of correct answers to all evaluation results evaluated using clusters obtained by clustering in the division method, for each of the plurality of division methods, not for each task. The control unit 101 may select the division method in which the ratio is the highest, as the optimum division method.

The control unit 101 may estimate whether or not the task is being performed, from measurement information measured by the sensor in the device 205 or estimate a task which is being performed, by the task estimation model of each task obtained by the selected division method.

For example, a value of 0 or more may be calculated in the task estimation model for a plurality of tasks with respect to measurement information in the predetermined time, and thus it may be determined that the plurality of tasks are being performed. In this case, the control unit 101 may estimate that a task in which the value of f(x) is the highest among the values of f(x) calculated by the task estimation models for the plurality of tasks, with respect to the measurement information. The weight vector w of the task estimation model may be constrained, for example, to minimize the norm of the weight vector w during learning. Even in a case where, with this constraint, values of 0 or more are calculated in the task estimation models for a plurality of tasks, and it is determined that the plurality of tasks are being performed, one task may be estimated from comparison of the value of f(x) calculated in each of the task estimation models.

Figure 10:
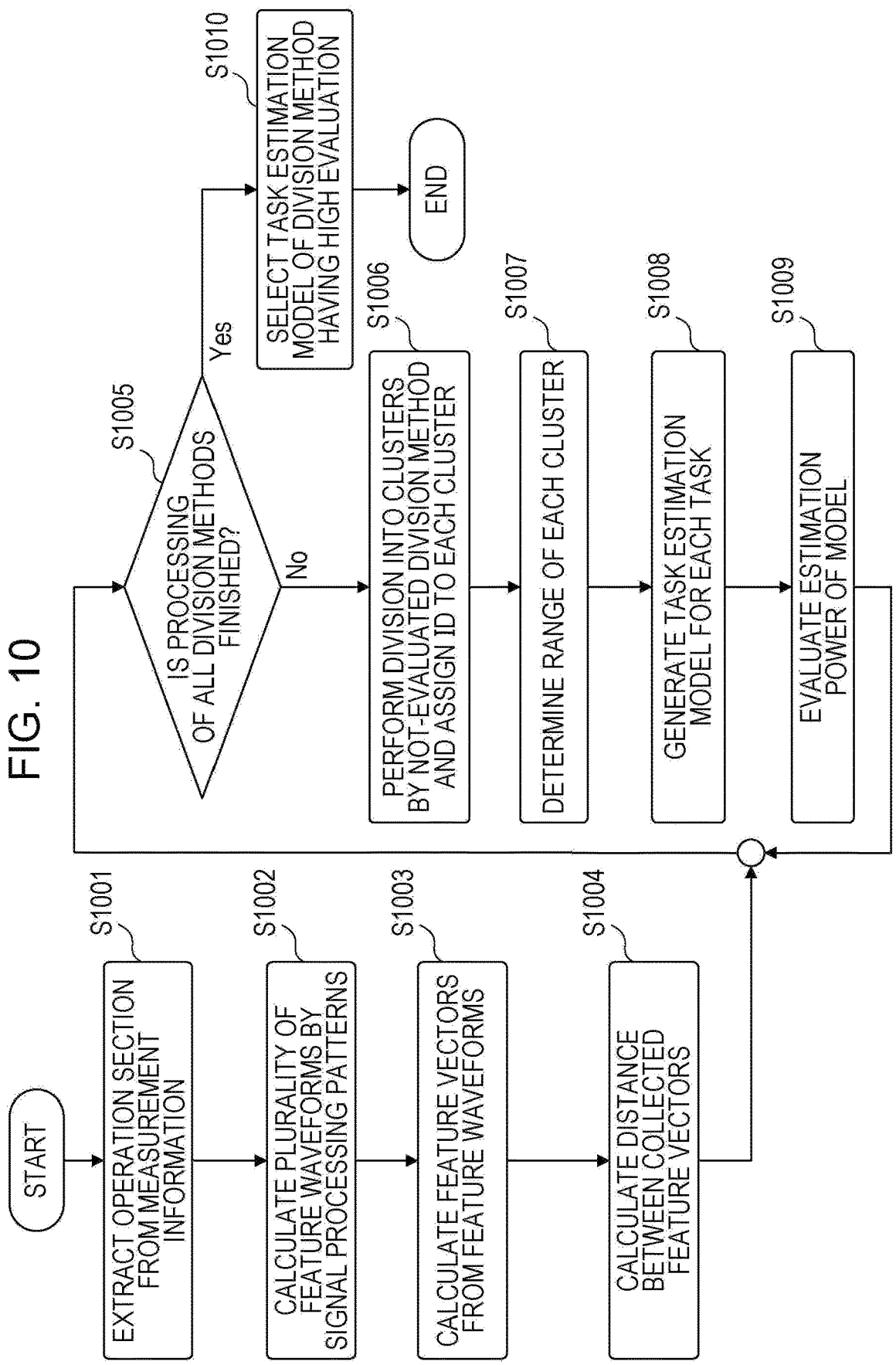
FIG. 10 is a diagram illustrating an operation flow of task estimation model generation processing according to a first embodiment.

The operation flow of task estimation model generation processing according to the above-described first embodiment will be described. FIG. 10 is a diagram illustrating the operation flow of task estimation model generation processing according to the first embodiment. When an execution instruction of task estimation model generation processing is input, the control unit 101 may start the operation flow in FIG. 10, for example.

In S1001, the control unit 101 reads measurement information from the storage unit 102 and extracts a plurality of operation sections from the measurement information. The measurement information set as a processing target in S1001 may be measurement information measured by one sensor in the device 205 put on the task performer who performs a task or be plural pieces of measurement information measured by a plurality of sensors.

The operation section may be a section including a time point at which a predetermined motion or state of the task performer has been detected, for example. As an example, the control unit 101 may extract a section of several seconds including a time point at which an angle of an arm tip of the task performer to the gravity direction is a peak (maximum), as the operation section, from the measurement information.

In S1002, the control unit 101 reads the plurality of signal processing patterns registered in the list 400 of the storage unit 102. The control unit 101 performs signal processing on measurement information in each of the extracted plurality of operation sections with each of the signal processing pattern and calculates plural pieces of feature waveform data for each piece of measurement information.

In S1003, the control unit 101 acquires a feature vector from each of the obtained plural pieces of feature waveform data. As an example, as described with reference to FIG. 5, the control unit 101 may extract a plurality of representative values from the feature waveform data and acquire feature vectors represented by a plurality of feature quantities obtained by reducing the dimensions of the extracted plurality of representative values with the principal component analysis.

In S1004, the control unit 101 calculates the distance between the obtained plurality of feature vectors. For the distance, a Euclidean distance or a Mahalanobis distance may be used. For the calculation of the distance, a Ward method, a group average method, the shortest distance method, the longest distance method, or the like may be used.

In S1005, the control unit 101 determines whether or not processing in all the plurality of division methods which have been designated in advance is finished. In a case where the processing in all the division methods is not finished (No in S1005), the flow proceeds to S1006. In the plurality of division methods, different clusters may be generated by division. For example, the plurality of division methods may be division methods designated by changing parameters such as the number of divisions, the division height, or the merge distance to be divided so that the number of clusters generated by division is different. Alternatively, the plurality of division methods may be designated by changing the division method such as division by designation of division number, division by designation of division height, and division by merge distance to be divided. Further, the plurality of division methods may be designated by a combination of a division method and the number of clusters to be generated. In a case where the plurality of division methods is designated by the number of divisions, the number of divisions of 2 to 100 may be designated in an example.

In S1006, the control unit 101 performs clustering of a plurality of feature vectors with a distance between the vectors by an unevaluated division method among the plurality of division methods designated in advance. Then, the control unit 101 assigns an identifier (ID) to the obtained cluster.

In S1007, the control unit 101 determines the range of the cluster by using points classified into the cluster, for each cluster. The range of the cluster may be determined by using the known techniques such as K nearest neighbor (kNN), for example.

In S1008, the control unit 101 refers to the task history information 900 to generate, for each task, a task estimation model using, as teaching data, measurement information for which the contents of a running task are known. The control unit 101 may generate the task estimation model for each task by using the SVM as described in the above-described section <Generation of Task Estimation Model>, for example.

In S1009, the control unit 101 evaluates the task estimation model generated for each task. For example, the control unit 101 may evaluate the task estimation model generated for each task in a manner as described in the above-described section <Evaluation of Task Estimation Model>.

In a case where the processing in all the division methods is finished (Yes in S1005), the flow proceeds to S1010. In S1010, the control unit 101 selects a division method with the highest evaluation based on the evaluation of the task estimation model for each task in each of the division methods. Then, the operation flow ends. For example, the control unit 101 may select the division method in which the average of the correct answer rates of the task estimation is the highest, as the optimum division method, for each of the plurality of division methods. Alternatively, the control unit 101 may obtain a ratio of correct answers to all evaluation results evaluated using clusters obtained by clustering in the division method, for each of the plurality of division methods, not for each task. The control unit 101 may select the division method in which the ratio is the highest, as the optimum division method.

As described above, according to the operation flow in FIG. 10, the control unit 101 evaluates estimation accuracy of the task by using the cluster generated by each of the plurality of division methods and determines the division method. Therefore, it is possible to determine a division method which has high accuracy of correct answers in practical estimation of task and to perform clustering. Further, the tendency of a fine operation which is not allowed to be easily determined by a person may be separated by using the element operation obtained in clustering for task estimation rather than using the element operation extracted as the operation by artificial judgment such as "stand up" or "sleep" as described above. Therefore, it is possible to improve estimation accuracy of a task by performing task estimation with the cluster obtained by evaluating the division method according to the first embodiment, as the element operation. For example, as described above, the teaching data for each element operation as in a case using the simple operation or state of the task performer such as "standing-up", "sleeping", "walking", and "running" is used as the element operation may not be prepared. Thus, it is possible to reduce the effort required to prepare the teaching data.

Second Embodiment

Figure 11A:
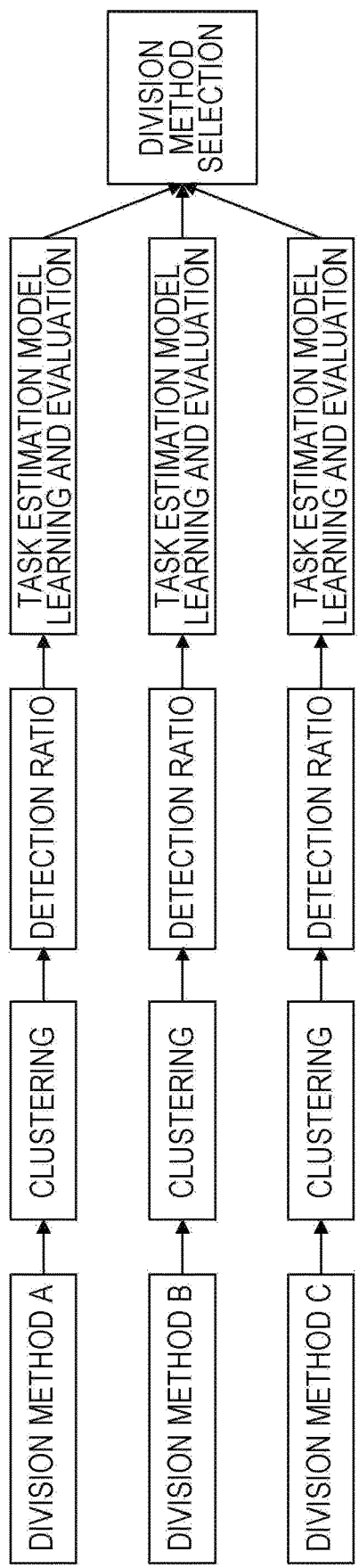
FIGS. 11A and 11B are diagrams illustrating generation of a task estimation model according to a second embodiment.
Figure 11B:
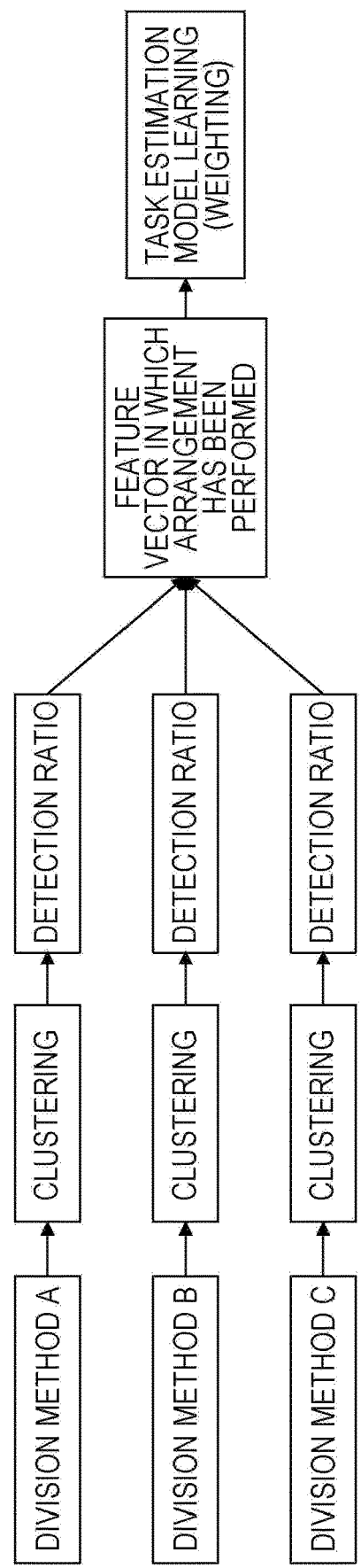

In the first embodiment, as illustrated in FIG. 11A, a case where cluster division is performed with changing the division method, and the task estimation model generated for each division method is evaluated is described. However, the embodiment is not limited thereto. For example, as illustrated in FIG. 11B, it is also considered that all clusters obtained by the plurality of division methods are used in parallel, learning is performed using teaching data, and the cluster useful for task estimation is weighted.

FIG. 12 is a diagram illustrating task estimation model generation processing in which the cluster is weighted, according to a second embodiment. When an execution instruction of task estimation model generation processing is input, the control unit 101 may start the operation flow in FIG. 12, for example.

Processes of S1201 to S1207 correspond to the processes of S1001 to S1007, for example. Thus, the control unit 101 may perform the processes similar to the processes of S1001 to S1007.

In S1208, the control unit 101 divides measurement information for which the contents of a running task are known, at a predetermined time interval, as teaching data. The control unit 101 obtains the detection ratio of the element operation of each cluster per predetermined time, from the number of element operations of each cluster to the number of element operations detected in the predetermined time.

In a case where the processing in all the division method is finished (Yes in S1205), the flow proceeds to S1209. In S1209, the control unit 101 obtains a feature vector in which the detection ratio of each cluster obtained in the plurality of division methods per predetermined time is provided as the component.

In S1210, the control unit 101 performs learning by using teaching data in which the feature vector of the detection ratio at the predetermined time interval is set as the input, and whether or not a task performed in the time section of the predetermined time is set as the output label. For example, in a case using the SVM, the control unit 101 generates the task estimation model weighted by the weight vector w in Expression 1 described above, for each task. When the control unit 101 generates the task estimation model for each task, the control unit 101 ends the operation flow.

As described above, in the second embodiment, the task estimation model is generated considering all the clusters obtained by the plurality of division methods. Thus, it is possible to improve the accuracy of task estimation. In the first embodiment, it is possible to reduce the number of clusters used for the task estimation model in comparison to the second embodiment. Thus, it is possible to reduce the amount of calculation.

Third Embodiment

In the above-described embodiments, for example, an example in which clustering of measurement information measured by at least one sensor in one device 205 is performed is described. However, the embodiment is not limited thereto. For example, measurement information may be obtained by measurement of a plurality of devices 205 put on the task performer 201, such as the badge 202 on the chest and the band 203 on the arm. At this time, the time point may be shifted between the plurality of devices 205. In this case, for example, even though the operation section is identified based on detection of a predetermined operation by one device 205, and the operation section of the same time section is extracted from another device 205, there is a concern that data of a time section in which the user does not actually perform the predetermined operation may be acquired due to the shift of the time point. As a result, it may be difficult to extract useful features in task determination. As another example, even though a motion of the arm tip is detected by the band 203 attached to the arm, and the operation section is extracted, the motion of the chest corresponding to the motion of the arm tip is hardly detected by the badge 202. In such a case, even if information of the same time section is collected by the badge 202 and the band 203, it may be difficult to extract information useful for task estimation from the badge 202.

Figure 13:
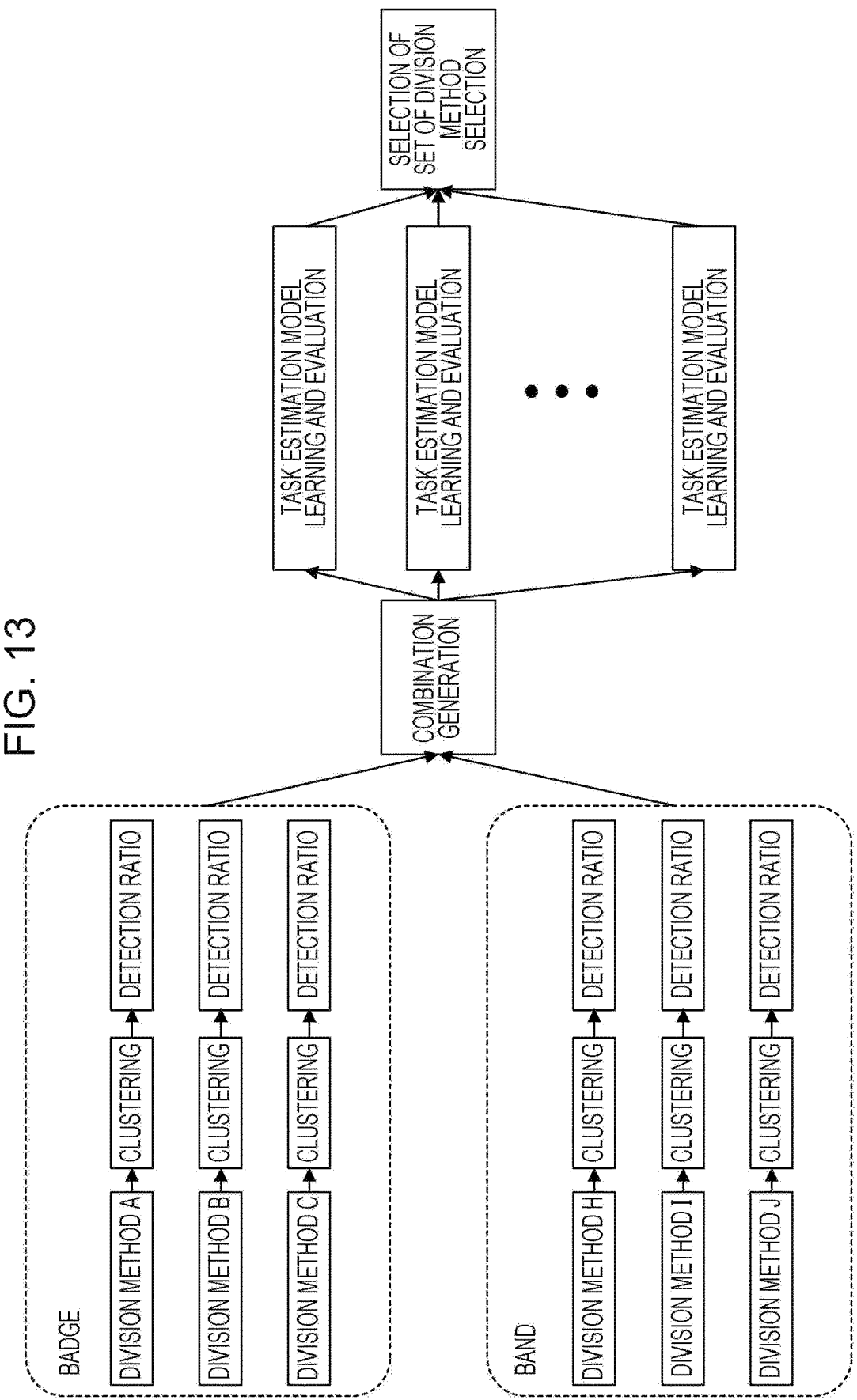
FIG. 13 is a diagram illustrating generation of a task estimation model according to a third embodiment.

Therefore, for example, under the circumstances as described above, the control unit 101 may separately perform clustering by the plurality of division methods for each device, combine the clusters obtained by the division methods in each device, and generate and evaluate a task estimation model. That is, for example, in the example in FIG. 13, the control unit 101 combines division methods A, B, and C for the badge 202 and division methods H, I, and J for the band 203. Thus, the control unit 101 generates division methods of combinations of A-H, A-I, A-J, B-H, B-I, B-J, C-H, C-I, and C-J.

The control unit 101 may perform learning and evaluation of the task estimation model for each task by using a feature vector in which the detection ratio of the cluster generated by each of the generated division combination methods, and select the task estimation model of a combination of the division methods, which has an excellent evaluation.

Figure 14:
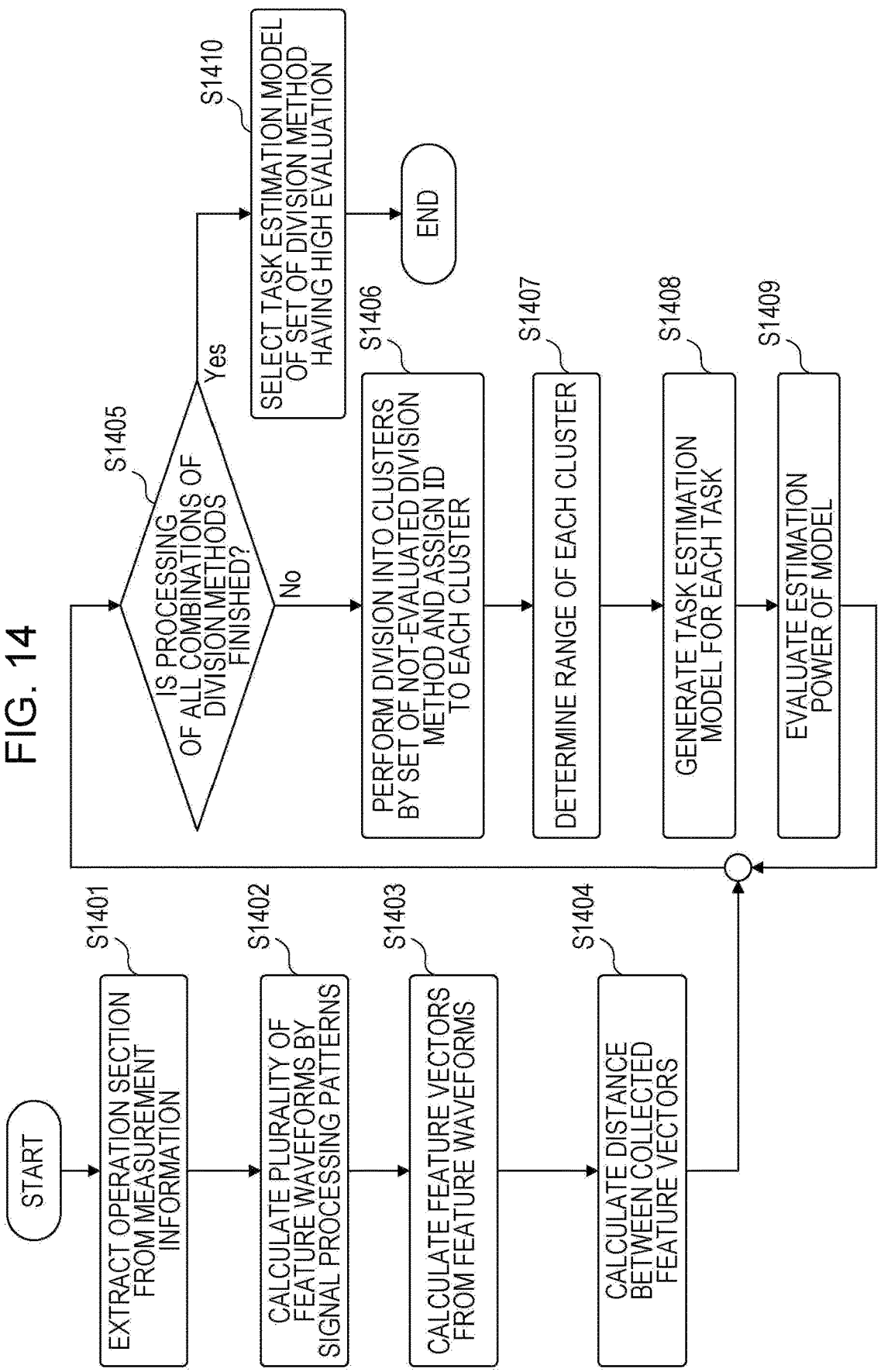
FIG. 14 is a diagram illustrating task estimation model generation processing according to a third embodiment.

FIG. 14 is a diagram illustrating task estimation model generation processing according to the third embodiment. When an execution instruction of task estimation model generation processing is input, the control unit 101 may start the operation flow in FIG. 14, for example.

Processes of S1401 to S1410 may correspond to the processes of S1001 to S1010, for example. Thus, the control unit 101 may perform the similar processes. In the operation flow in FIG. 14, in S1401 to S1404, the control unit 101 performs processing on each of plural pieces of measurement information measured by the plurality of devices 205.

In S1405, the control unit 101 generates a combination of the division methods set for the plurality of devices 205 and determines whether or not processing on all combinations of the division methods is finished. In a case where the processing on all the combinations is not finished (No in S1405), the flow proceeds to S1406. The control unit 101 may perform processing on not-processed combinations in S1406 to S1409. The control unit 101 may select a task estimation model of a combination of the division methods, which has the highest evaluation in S1410, based on the obtained evaluations of the combinations.

Figure 15:
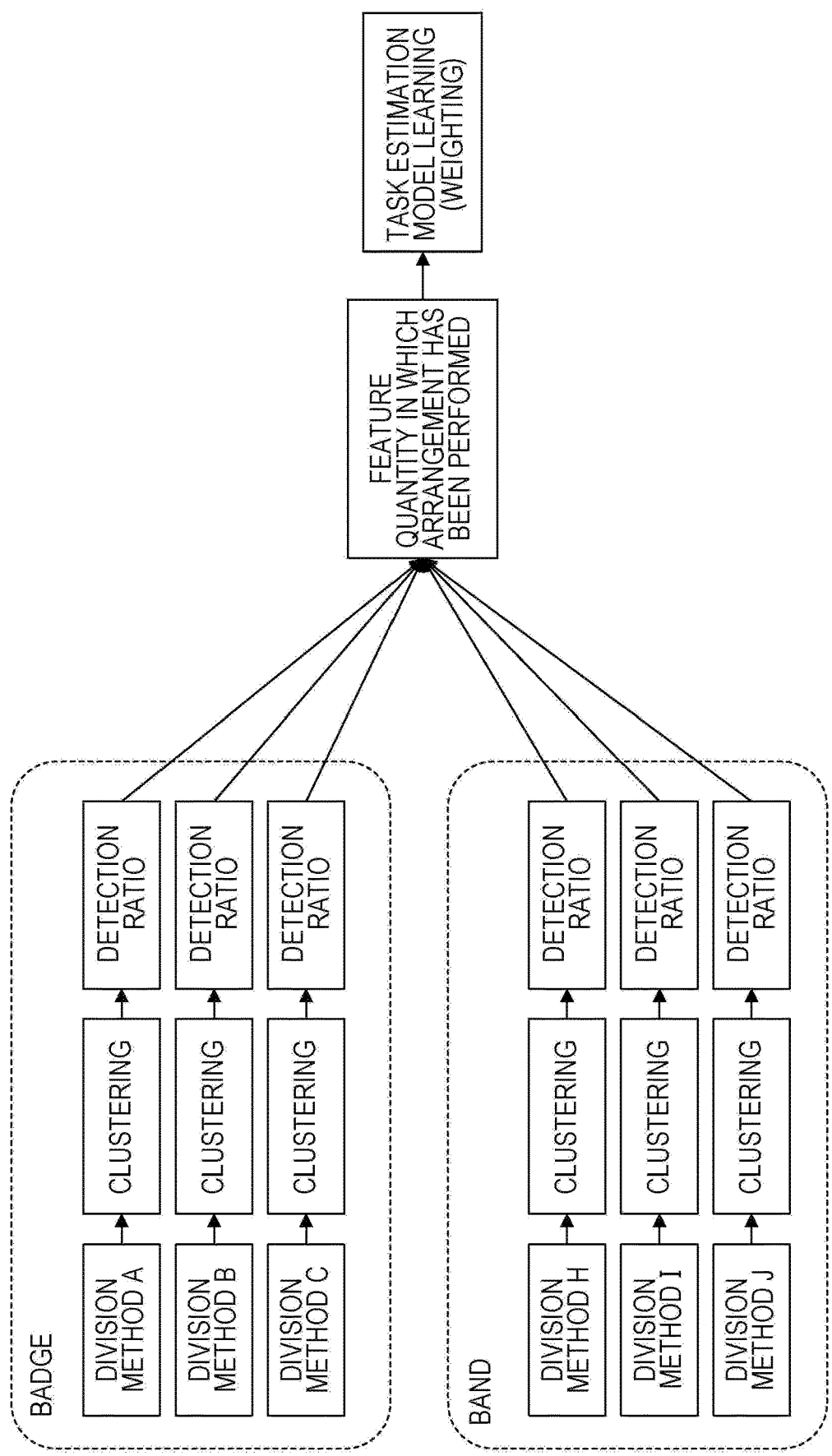
FIG. 15 is a diagram illustrating generation of a task estimation model according to a modification example of a third embodiment.

Alternatively, in a modification of the third embodiment, as illustrated in FIG. 15, the control unit 101 may perform learning of the task estimation model for each task and weight the cluster, by using feature vectors in which detection ratios of all clusters generated by the plurality of division methods set for each of the devices 205 are set as components.

Figure 16:
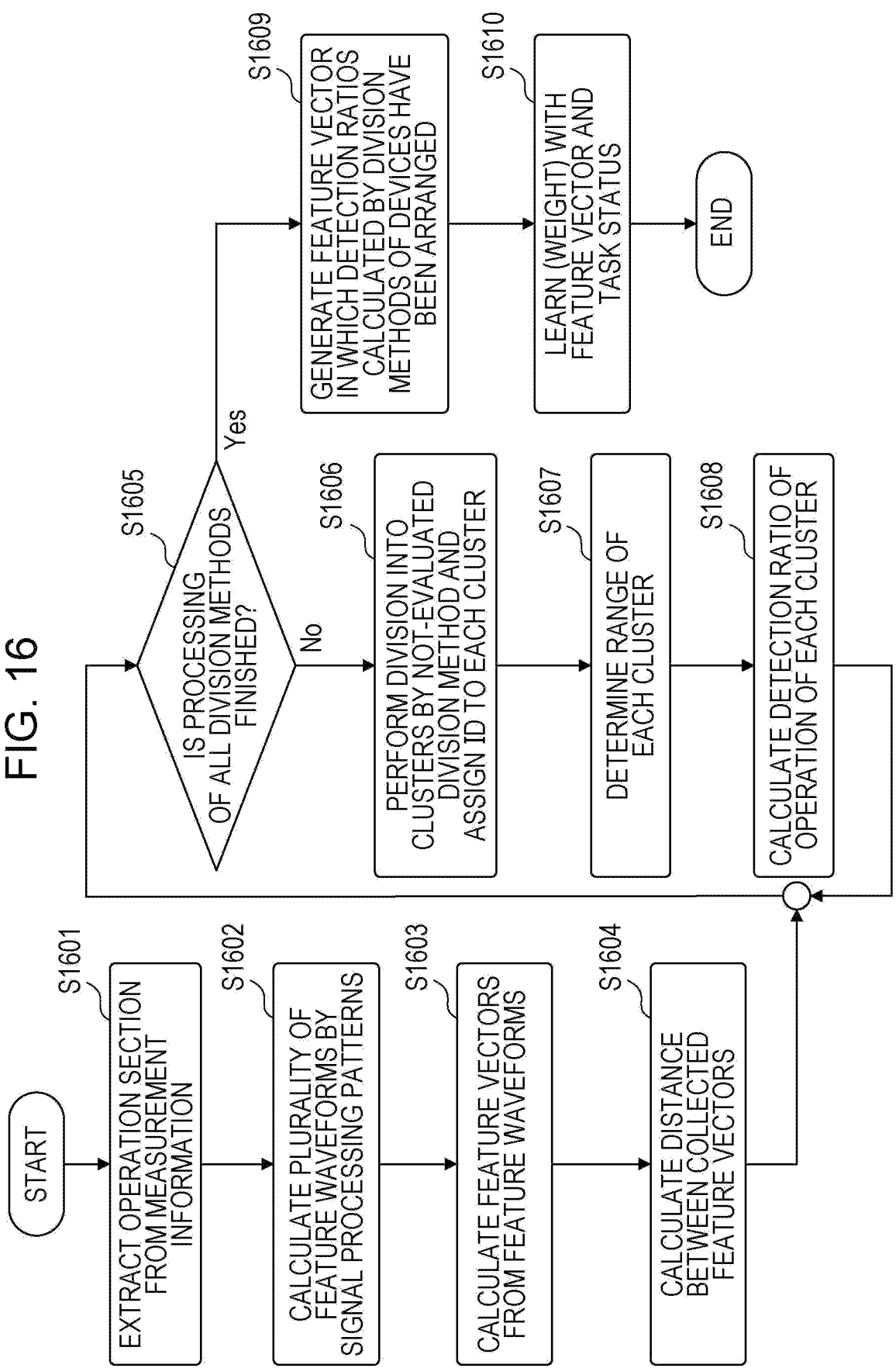
FIG. 16 is a diagram illustrating task estimation model generation processing according to the modification example of a third embodiment.

FIG. 16 is a diagram illustrating task estimation model generation processing according to the modification example of the third embodiment. When an execution instruction of task estimation model generation processing is input, the control unit 101 may start the operation flow in FIG. 16, for example.

Processes of S1601 to S1610 may correspond to the processes of S1201 to S1210, for example. Thus, the control unit 101 may perform the similar processes. In the operation flow in FIG. 16, in S1601 to S1604, the control unit 101 performs processing on each of plural pieces of measurement information measured by the plurality of devices 205.

In S1605 to S1608, the control unit 101 performs processing for each of all division methods of all devices 205 and calculates a detection ratio of a cluster by each of the division methods. In S1609 to S1610, the control unit 101 performs learning by generating feature vectors in which detection ratios of clusters obtained by each of the division methods in each of the plurality of devices 205 in parallel, and generates a task estimation model for each task.

As described above, according to the processing in FIGS. 14 and 16, it is possible to use the measurement information obtained from the plurality of devices 205 for task estimation. According to the operation flow illustrated in FIG. 16, the number of detection ratios of clusters used for generating the task estimation model increases in comparison to that in the operation flow illustrated in FIG. 14. Thus, it is possible to improve estimation accuracy of a task. In the operation flow illustrated in FIG. 14, the number of detection ratios of clusters used for generating one task estimation model is reduced in comparison to that in the operation flow illustrated in FIG. 16. Thus, it is possible to reduce the amount of calculation.

Figure 17:
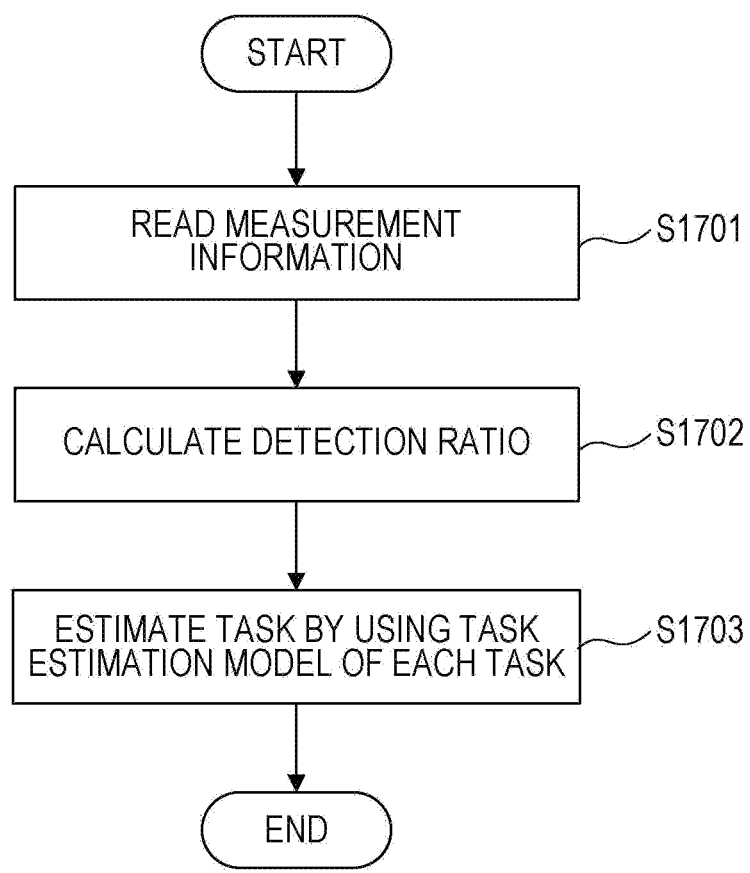
FIG. 17 is a diagram illustrating task estimation processing according to embodiments.

FIG. 17 is a diagram illustrating task estimation processing according to the embodiments. For example, when the control unit 101 receives an instruction to estimate a task, the control unit 101 may start the operation flow in FIG. 17.

In S1701, the control unit 101 reads measurement information of an estimation target of a task from the storage unit 102. In S1702, the control unit 101 divides the read measurement information at a predetermined time interval and calculates a detection ratio from a section of the predetermined time. For example, the control unit 101 may calculate the detection ratio of the cluster used in the task estimation model generated by any type of processing illustrated in FIGS. 10, 12, 14, and 16. In S1703, the control unit 101 determines whether or not a task in the task estimation model is being performed, by inputting the calculated detection ratio to the task estimation model of each task. In a case where it is determined that a plurality of tasks is being performed, the control unit 101 may determine that the task in the task estimation model having the highest evaluation is being performed. For example, in a case where the task estimation model is represented by Expression 1, the control unit 101 may determine that the task in which the value of f(x) is the highest is being performed.

In the above descriptions, the embodiments are described, but are not limited thereto. For example, the above-described operation flows are examples. The embodiment is not limited thereto. If possible, the operation flow may be performed by changing the order of processing or may include an additional process. A portion of the processing may be omitted. For example, determination processing of a task in FIG. 17 may be performed subsequent to the above-described task estimation model generation processing in FIGS. 10, 12, 14, and 16.

Figure 18:
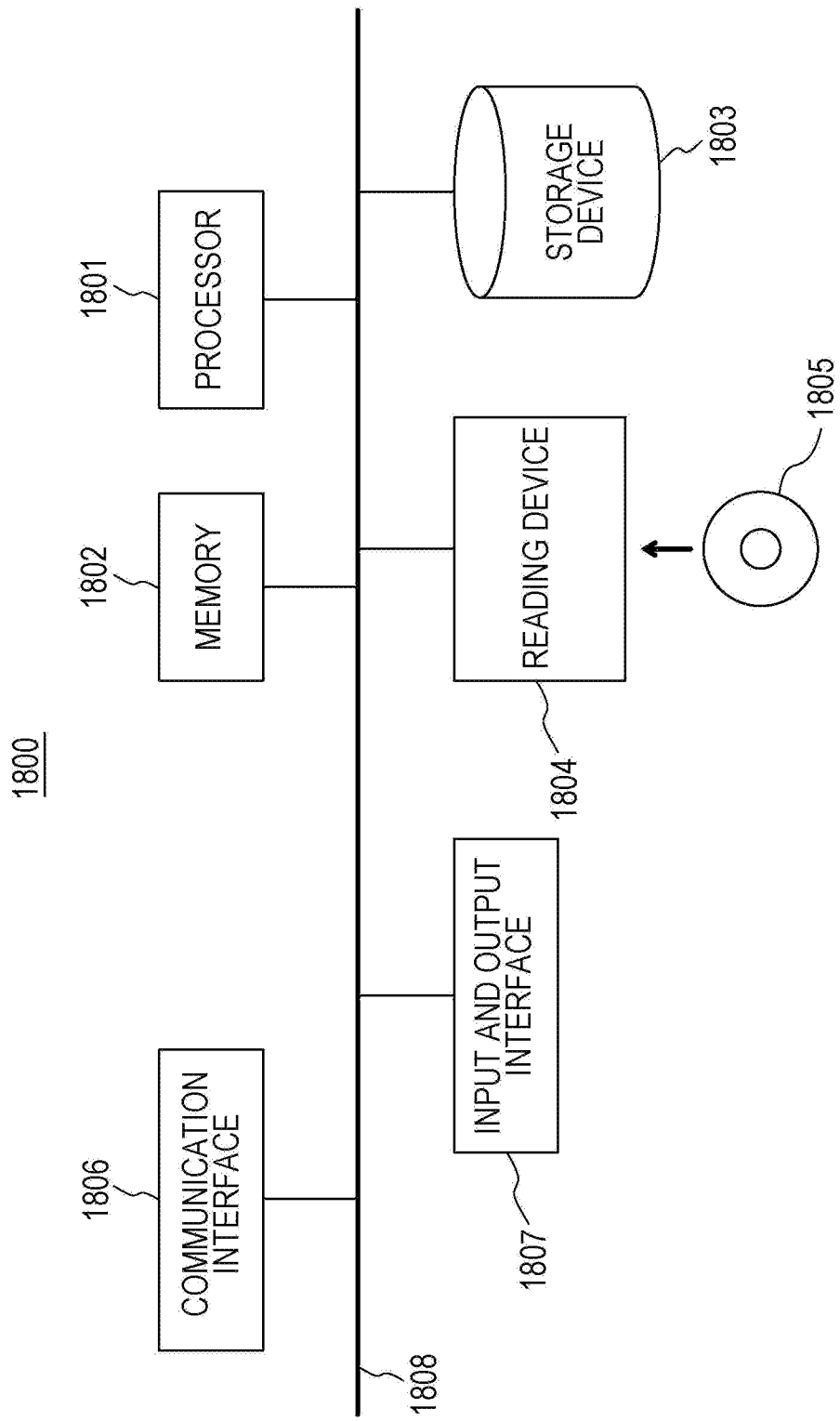
FIG. 18 is a diagram illustrating a hardware configuration of a computer for implementing an information processing apparatus according to embodiments.

FIG. 18 is a diagram illustrating a hardware configuration of a computer 1800 for implementing the information processing apparatus 100 according to the embodiments. In FIG. 18, the hardware configuration for implementing the information processing apparatus 100 includes a processor 1801, a memory 1802, a storage device 1803, a reading device 1804, a communication interface 1806, and an input and output interface 1807, for example. The processor 1801, the memory 1802, the storage device 1803, the reading device 1804, the communication interface 1806, and the input and output interface 1807 are coupled to each other via a bus 1808, for example.

The processor 1801 may be, for example, a single processor, a multiprocessor, or a multicore. The processor 1801 provides some or all of the above-described functions of the control unit 101 by executing, using the memory 1802, a task estimation program in which the procedures of the above-described operation flow is described, for example.

The memory 1802 is, for example, a semiconductor memory, and may include a RAM area and a ROM area. The storage device 1803 is, for example, a hard disk, a semiconductor memory such as a flash memory, or an external storage device. The RAM is an abbreviation for a random access memory. The ROM is an abbreviation for a read-only memory.

The reading device 1804 accesses a removable storage medium 1805 in accordance with an instruction of the processor 1801. For example, the removable storage medium 1805 is implemented by a semiconductor device (USB memory or the like), a medium (a magnetic disk or the like) to which information is input and output by a magnetic action, a medium (CD-ROM, DVD, or the like) to which information is input and output by an optical action. The USB is an abbreviation for a universal serial bus. The CD is an abbreviation for a compact disc. The DVD is an abbreviation for a digital versatile disk.

The above-described storage unit 102 may include the memory 1802, the storage device 1803, and the removable storage medium 1805, for example. For example, the list 400 and the task history information 900 are stored in the storage device 1803 of the information processing apparatus 100.

The communication interface 1806 transmits and receives data via a network, in accordance with an instruction of the processor 1801. The input and output interface 1807 may be an interface with an input device and an output device, for example. The input device is a device such as a keyboard or a mouse, that receives an instruction from the task performer, for example. For example, the output device is a display device such as a display and a sound device such as a speaker.

The program according to the embodiments is provided to the information processing apparatus 100 in the following form, for example.

(1) The program is installed in advance, in the storage device 1803.

(2) The program is provided by the removable storage medium 1805.

(3) The program is provided from a server such as a program server.

The hardware configuration of the computer 1800 for implementing the information processing apparatus 100, which is described with reference to FIG. 18 is an example. The embodiment is not limited thereto. For example, some or all of the above-described functions may be mounted by hardware with an FPGA or an SoC. The FPGA is an abbreviation for a field programmable gate array. The SoC is an abbreviation for a system-on-a-chip.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A task estimation method comprising:
   acquiring, by a computer, first measurement information measured by a first device put on a task performer;
   detecting a predetermined first operation in the first measurement information;
   extracting first feature vectors from a first operation section in which the predetermined first operation has been detected;
   dividing the extracted first feature vectors into first clusters by first division methods;
   obtaining first ratios at which the extracted first feature vectors are classified into the respective first clusters in a predetermined time;
   performing learning by using the first ratios as an input and using, as an output label, information indicating whether or not the task performer performs a predetermined task in the predetermined time;
   generating a task estimation model by determining weighting for the first clusters based on a result of the learning; and
   estimating, by using the task estimation model, whether or not the task performer is in a process of performing the predetermined task.

2. The task estimation method according to claim 1, further comprising:
   obtaining task estimation models by generating the task estimation model for each of tasks to be performed by the task performer; and
   estimating a task performed by the task performer among the tasks by using the task estimation models.

3. The task estimation method according to claim 1, further comprising:
   acquiring second measurement information measured by a second device put on the task performer;
   detecting a predetermined second operation in the second measurement information;
   extracting second feature vectors from a second operation section in which the predetermined second operation has been detected;
   dividing the extracted second feature vectors into second clusters by second division methods;
   obtaining second ratios at which the extracted second feature vectors are classified into the respective second clusters in the predetermined time; and
   performing the learning by further using the second ratios as the input.

4. The task estimation method according to claim 1, further comprising:
   obtaining task estimation models by generating the task estimation model for each of the first division methods;
   selecting one task estimation model from the task estimation models based on estimation accuracies obtained from the task estimation models; and
   estimating, by using the selected one task estimation model, whether or not the task performer is in a process of performing the predetermined task.

5. The task estimation method according to claim 3, further comprising:
   performing the learning, for each of combinations of the first division methods and the second division methods, by using the first ratios and the second ratios as the input;
   obtaining task estimation models by generating the task estimation model for each of the combinations by determining weighting for the first clusters and the second clusters based on the result of the learning;
   selecting one task estimation model from the task estimation models based on estimation accuracies obtained from the task estimation models; and
   estimating, by using the selected one task estimation model, whether or not the task performer is in a process of performing the predetermined task.

6. An information processing apparatus comprising:
   a processor configured to:
   acquire first measurement information measured by a first device put on a task performer;
   detect a predetermined first operation in the first measurement information;
   extract first feature vectors from a first operation section in which the predetermined first operation has been detected;
   divide the extracted first feature vectors into first clusters by first division methods;
   obtain first ratios at which the extracted first feature vectors are classified into the respective first clusters in a predetermined time;
   perform learning by using the first ratios as an input and using, as an output label, information indicating whether or not the task performer performs a predetermined task in the predetermined time;
   generate a task estimation model by determining weighting for the first clusters based on a result of the learning; and
   estimate, by using the task estimation model, whether or not the task performer is in a process of performing the predetermined task.

7. A non-transitory computer-readable recording medium having stored therein a program that causes a computer to execute a process, the process comprising:
   acquiring first measurement information measured by a first device put on a task performer;
   detecting a predetermined first operation in the first measurement information;
   extracting first feature vectors from a first operation section in which the predetermined first operation has been detected;
   dividing the extracted first feature vectors into first dusters by first division methods;
   obtaining first ratios at which the extracted first feature vectors are classified into the respective first clusters in a predetermined time;

performing learning by using the first ratios as an input and using as an output label, information indicating whether or not the task performer performs a predetermined task in the predetermined time;

generating a task estimation model by determining weighting for he first dusters based on a result of the learning; and estimating, by using the task estimation model, whether or not the task performer is in a process of performing the predetermined task.

* * * * *